United States Patent
Goel et al.

(10) Patent No.: US 8,909,304 B1
(45) Date of Patent: Dec. 9, 2014

(54) WIRELESS NETWORK WITH POWER SAVE MODE

(75) Inventors: Sandesh Goel, Fremont, CA (US); Partho Mishra, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 1600 days.

(21) Appl. No.: 11/269,272

(22) Filed: Nov. 8, 2005

Related U.S. Application Data

(60) Provisional application No. 60/685,469, filed on May 26, 2005.

(51) Int. Cl.
*H04M 1/00* (2006.01)
*H04B 1/38* (2006.01)

(52) U.S. Cl.
USPC ............... 455/574; 455/127.1; 455/343.1; 370/329

(58) Field of Classification Search
USPC ......... 370/230, 332, 311, 335, 338, 350, 329; 455/574, 414.1, 127.1, 343.1
See application file for complete search history.

(56) References Cited

U.S. PATENT DOCUMENTS

| | | | |
|---|---|---|---|
| 7,085,595 B2 * | 8/2006 | Kitchin | 455/574 |
| 7,349,355 B2 * | 3/2008 | Sengupta et al. | 370/311 |
| 7,372,855 B2 * | 5/2008 | Kandala | 370/394 |
| 2003/0091066 A1 * | 5/2003 | Choi et al. | 370/468 |
| 2004/0264397 A1 * | 12/2004 | Benveniste | 370/311 |
| 2005/0009578 A1 * | 1/2005 | Liu | 455/574 |
| 2006/0029024 A1 * | 2/2006 | Zeng et al. | 370/335 |
| 2006/0045051 A1 * | 3/2006 | Floros et al. | 370/332 |
| 2006/0052088 A1 * | 3/2006 | Pavon et al. | 455/414.1 |
| 2006/0062189 A1 * | 3/2006 | Takeuchi | 370/338 |
| 2006/0165046 A1 * | 7/2006 | Del Prado Pavon | 370/350 |
| 2006/0171341 A1 * | 8/2006 | Wang et al. | 370/311 |
| 2006/0268702 A1 * | 11/2006 | Ali et al. | 370/230 |
| 2007/0083624 A1 * | 4/2007 | Soomro | 709/223 |
| 2007/0259700 A1 * | 11/2007 | Meier et al. | 455/574 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

(Continued)

*Primary Examiner* — Awet Haile

(57) ABSTRACT

A quality-of-service enhanced access point (QAP) is provided. The QAP includes a signaling module that receives call signaling information and transmits a timing offset for a quality-of-service enhanced station (QSTA). A call offset scheduler module determines the timing offset based on the call signaling information. A buffer buffers data addressed to the QSTA, and a wireless local area network (WLAN) driver module automatically transmits at least a portion of the buffered data to the QSTA based on the timing offset.

20 Claims, 9 Drawing Sheets

(56) References Cited

OTHER PUBLICATIONS

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11b-1999/Cor 1-2001 (Corrigendum to IEEE Std 802.11-1999); IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 2: Higher-Speed Physical Layer (PHY) extension in the 2.4 GHz Band—Corrigendum 1; LAN/MAN Standards Committee of the IEEE Computer Society; Nov. 7, 2001; 23 pages.

IEEE Std 802.11g/D2.8, May 2002 (Supplement to ANSI/IEEE Std 802.11, 1999 Edition) Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band; LAN/MAN Standards Committee of the IEEE Computer Society; 53 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE Std 802.11h-2003 (Amendment to IEEE Std 802.11, 1999 Edition (Reaff 2003)); as amended by IEEE Stds 802.11a-1999, 802.11b-1999, 802.11b-1999/Cor 1-2001, 802.11d-2001, and 802.11g-2003; IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 74 pages.

802.11n; IEEE P802.11-04/0889r6; Wireless LANs, TGn Sync Proposal Technical Specification; 131 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14, 23 pages.

\* cited by examiner

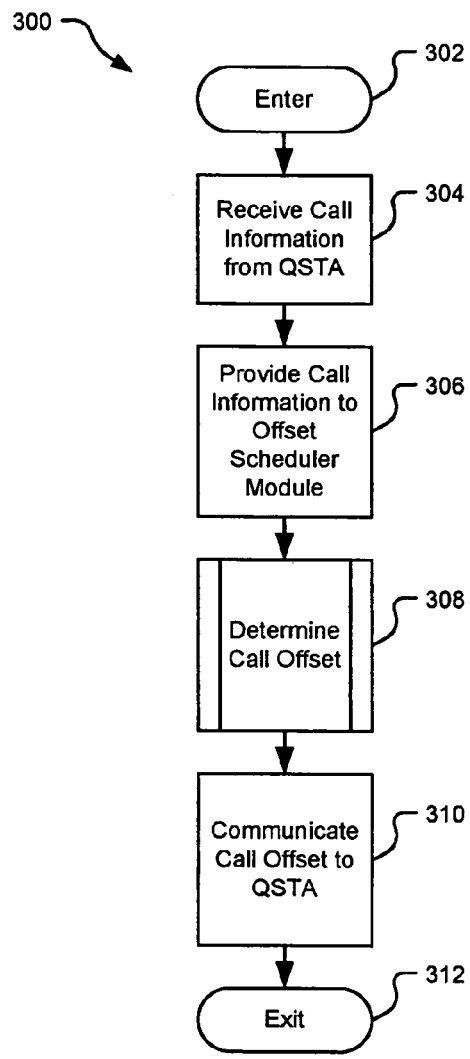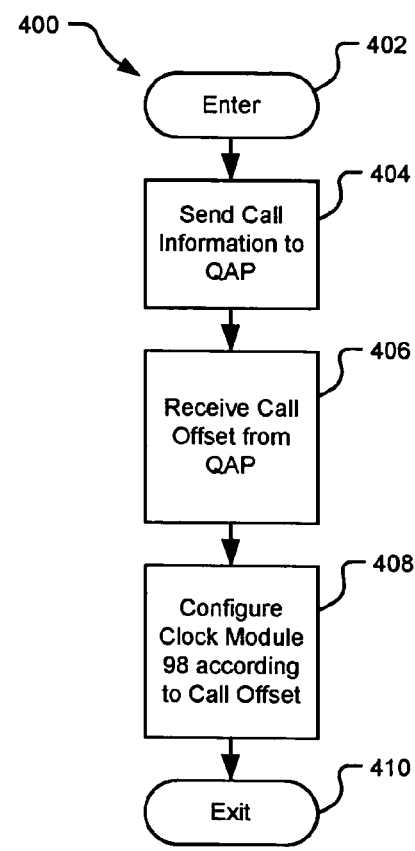
FIG. 6
FIG. 8

WIRELESS NETWORK WITH POWER SAVE MODE

CROSS-REFERENCE TO RELATED APPLICATIONS

This application claims priority of U.S. Provisional Patent Application Ser. No. 60/685,469, filed on May 26, 2005. The disclosure of the above application is incorporated herein by reference in its entirety.

FIELD OF THE INVENTION

The present invention relates to wireless network interfaces, and more particularly to wireless network devices having power-saving modes.

BACKGROUND OF THE INVENTION

Referring now to FIG. 1, a wireless local area network 10 is shown. A quality-of-service (QOS) enhanced wireless access point (QAP) 12 has a connection 14 to a distributed communications system (DCS) 16 such as the Internet. One or more QOS enhanced wireless stations 18-1, 18-2, 18-3, . . . , 18-N (collectively QSTAs 18), are in wireless communication with the QAP 12. The QSTAs 18 may include wireless telephone handsets that use a voice-over-internet protocol (VoIP). The QAP 12 provides each of the QSTAs 18 with a communication path to the DCS 16.

The QSTAs 18 can be battery poweredand employ a power saving mode to conserve power. When the power saving mode is enabled, the QSTAs 18 periodically enter a sleep mode, during which they are unable to communicate with the QAP 12. Therefore, each QSTA 18 sends a power save message to the QAP 12 before entering the power savings mode. In response to receiving the power save message, the QAP 12 buffers data destined for each QSTA 18 that has entered the power save mode. While in the power save mode, each QSTA 18 wakes up periodically, waits for access to the wireless channel, and then sends a polling message to the QAP 12. When the QAP 12 receives the polling message, it sends the buffered data to the polling QSTA 18. The QSTA 18 then reenters the sleep mode until its next scheduled wake up time.

Referring now to FIG. 2, exemplary power saving mode transmissions between the QAP 12 and one of the QSTAs 18 are shown. Prior to a time 50, the QSTA 18 is asleep in the power save mode. At the time 50, the QSTA 18 wakes up and executes a collision avoidance protocol during a time 51. The QSTA 18 then sends the polling message 52 to the QAP 12. In response to receiving the polling message 52, the QAP 12 sends packets of buffered data 54-1, . . . , 54-M to the polling QSTA 18. The QAP 12 sets a bit in the last packet of buffered data 54 to indicate an end of service period (EOSP) 56. Upon receiving the EOSP 56 indication, the QSTA 18 goes back to sleep until the cycle repeats at a time 58.

The QSTA 18 is in the sleep mode and conserving power between the EOSP 56 and the time 58. The QSTA 18 is awake and consuming full-power mode between the time 50 and the EOSP 56. It remains desirable in the art to reduce power consumption in the QSTAs 18.

SUMMARY OF THE INVENTION

A quality-of-service enhanced access point (QAP) is provided. The QAP includes a signaling module that receives call signaling information and transmits a timing offset for a quality-of-service enhanced station (QSTA). A call offset scheduler module determines the timing offset based on the call signaling information. A buffer buffers data addressed to the QSTA, and a wireless local area network (WLAN) driver module receives polling messages from the QSTA that are aligned with the timing offset and in response thereto transmits at least a portion of the buffered data to the QSTA.

In other features, the WLAN driver module further comprises a timer that is synchronized with the polling messages. The call signaling information can include at least one of a maximum service interval, a minimum service interval, and a mean data rate. The timing offset can include one of a plurality of timing offsets, wherein each of the timing offsets is associated with a respective one of a plurality of time slots. The time slots can be of equal duration. The call offset scheduler module can selectively change timing offsets for quality of service enhanced stations (QSTA) based on a packet error rate (PER).

In other features, the signaling module, the call offset scheduler module, the buffer, and the WLAN driver module are implemented in a medium access control (MAC) module. A physical layer module (PHY) can communicate with the MAC and be otherwise compliant with one of Bluetooth, IEEE 802.11, 802.11a, 802.11b, 802.11g, 802.11h, 802.11n, 802.16, and 802.20. A wireless telephone system can includes the QAP and further comprise a wireless telephone handset that includes an audio output and an audio input, and an interface module that communicates with the QSTA, the audio output, and the audio input.

A method of operating a quality-of-service enhanced access point (QAP) is provided. The method includes receiving call signaling information, determining a timing offset based on the call signaling information, transmitting the timing offset, buffering data that is addressed to a quality-of-service enhanced station (QSTA) that is associated with the timing offset, receving polling messages aligned with the timing offset, and transmitting at least a portion of the buffered data in response to receiving each of the polling messages.

In other features, the method includes waking up prior to receiving each of the polling messages and thereafter going back to sleep. The call signaling information can include at least one of a maximum service interval, a minimum service interval, and a mean data rate. The timing offset can include one of a plurality of timing offsets, and each of the timing offsets is associated with a respective one of a plurality of time slots. The time slots can be of equal duration. The method can include selectively changing the timing offset associated with the QSTA based on a packet error rate (PER).

In other features, the method includes providing a media access controller (MAC) that executes the steps of receiving, determining, transmitting, buffering, and automatically transmitting. The receiving step and the transmitting step can be compliant with one of Bluetooth, IEEE 802.11, 802.11a, 802.11b, 802.11g, 802.11h, 802.11n, 802.16, and 802.20. A method is also provided for operating a wireless telephone system that includes the method above and further comprises generating an audio output based on at least a portion of the buffered data.

A computer program executed by a processor comprising operating a quality-of-service enhanced access point (QAP) is provided. The computer program includes receiving call signaling information, determining a timing offset based on the call signaling information, transmitting the timing offset, buffering data that is addressed to a quality-of-service enhanced station (QSTA) that is associated with the timing offset, receving polling messages aligned with the timing offset, and transmitting at least a portion of the buffered data in response to receiving each of the polling messages.

In other features, the computer program includes waking up prior to receiving each of the polling messages and thereafter going back to sleep. The call signaling information can include at least one of a maximum service interval, a minimum service interval, and a mean data rate. The timing offset can include one of a plurality of timing offsets, and each of the timing offsets is associated with a respective one of a plurality of time slots. The time slots can be of equal duration. The computer program can include selectively changing the timing offset associated with the QSTA based on a packet error rate (PER).

In other features, the computer program includes providing a media access controller (MAC) that executes the steps of receiving, determining, transmitting, buffering, and automatically transmitting. The receiving step and the transmitting step can be compliant with one of Bluetooth, IEEE 802.11, 802.11a, 802.11b, 802.11g, 802.11h, 802.11n, 802.16, and 802.20. A computer program is also provided for operating a wireless telephone system that includes the computer program above and further comprises generating an audio output based on at least a portion of the buffered data.

A quality-of-service enhanced access point (QAP) is provided that includes signaling means for receiving call signaling information and transmitting a timing offset for a quality-of-service enhanced station (QSTA), call offset scheduling means for determining the timing offset based on the call signaling information, buffer means for buffering data addressed to the QSTA, and wireless local area network (WLAN) driver means for receiving polling messages from the QSTA that are aligned with the timing offset and in response thereto transmitting at least a portion of the buffered data to the QSTA.

In other features, the WLAN driver means further comprises timing means for synchronizing with the polling messages. The call signaling information can include at least one of a maximum service interval, a minimum service interval, and a mean data rate. The timing offset can include one of a plurality of timing offsets, and each of the timing offsets is associated with a respective one of a plurality of time slots. The time slots can be of equal duration. The call offset scheduling means can selectively change timing offsets for quality of service enhanced stations (QSTA) based on a packet error rate (PER).

In other features, media access control (MAC) means includes the signaling means, the call offset scheduling means, the buffer means, and the WLAN driver means. Physical layer (PHY) means for communicating with the MAC means can be included and be otherwise compliant with one of Bluetooth, IEEE 802.11, 802.11a, 802.11b, 802.11g, 802.11h, 802.11n, 802.16, and 802.20.

In other features, a wireless telephone system includes the QAP and further comprises a wireless telephone handset. The wireless telephone handset includes audio output means for generating an audio signal and audio input means for receiving an audio signal, and interface means for communicating with the QSTA, the audio output means, and the audio input means.

A quality-of-service enhanced wireless station (QSTA) is provided. The QSTA includes a signaling module that transmits call signaling information and receives a timing offset that is based on the call signaling information, and a wireless local area network (WLAN) driver module that includes a sleep mode for conserving power and that periodically wakes up based on the timing offset, immediately sends a polling message, and receives data that is addressed to the QSTA.

In other features, the WLAN driver module further comprises a timer for waking up the WLAN module. The call signaling information can include at least one of a maximum service interval, a minimum service interval, and a mean data rate. The timing offset can include one of a plurality of timing offsets, and each of the timing offsets is associated with a respective one of a plurality of time slots. The time slots can be of equal duration.

In other features, the signaling module and the WLAN driver module are implemented in a medium access control (MAC) module. A physical layer module (PHY) can communicate with the MAC and is otherwise compliant with one of Bluetooth, IEEE 802.11, 802.11a, 802.11b, 802.11g, 802.11h, 802.11n, 802.16, and 802.20. A telephone handset can communicate with the PHY through an interface module.

In other features, a wireless network includes the QSTA and a quality-of-service enhanced access point (QAP). The QAP includes a second signaling module that receives the call signaling information from the QSTA and transmits the timing offset to the QSTA, a call offset scheduler module that determines the timing offset based on the call signaling information, a buffer that buffers the data addressed to the QSTA, and a wireless local area network (WLAN) driver module that transmits at least a portion of the buffered data to the QSTA in response to receiving the polling message.

In other features, a wireless telephone handset is provided that includes the QSTA, an audio output and an audio input, and an interface module that communicates with the QSTA, the audio output, and the audio input.

A method of operating a quality-of-service enhanced wireless station (QSTA) is provided. The method includes transmitting call signaling information, receiving a timing offset that is based on the call signaling information, entering a sleep mode for conserving power, and periodically waking up based on the timing offset and immediately sending a polling message and receiving data that is addressed to the QSTA.

In other features, the step of periodically waking up is executed at regular intervals. The call signaling information can include at least one of a maximum service interval, a minimum service interval, and a mean data rate. The timing offset can include one of a plurality of timing offsets, and each of the timing offsets is associated with a respective one of a plurality of time slots. The time slots can be of equal duration.

In other features, a media access controller executes the steps of transmitting call signaling information, receiving the timing offset, entering the sleep mode, and periodically waking up. The steps of transmitting call signaling information and receiving the timing offset can be otherwise compliant with one of Bluetooth, IEEE 802.11, 802.11a, 802.11b, 802.11g, 802.11h, 802.11n, 802.16, and 802.20. The method can include generating an audio signal based on the data.

In other features, a method of operating a wireless network is provided. The method includes the method described above and further comprises a method of operating a quality-of-service enhanced access point (QAP) that includes receiving the call signaling information from the QSTA, determining the timing offset based on the call signaling information, transmitting the timing offset to the QSTA, and transmitting at least a portion of the buffered data to the QSTA in response to receiving the polling message.

In other features, a method of operating a wireless telephone handset is also provided that further includes generating an audio output signal based on the data, generating an audio input signal based on an audible signal, and periodically transmitting the digitized audio input signal.

A computer program executed by a processor comprising operating a quality-of-service enhanced wireless station (QSTA) is provided. The computer program includes transmitting call signaling information, receiving a timing offset that is based on the call signaling information, entering a sleep mode for conserving power, and periodically waking up based on the timing offset and immediately sending a polling message and receiving data that is addressed to the QSTA.

In other features, the step of periodically waking up is executed at regular intervals. The call signaling information can include at least one of a maximum service interval, a minimum service interval, and a mean data rate. The timing offset can include one of a plurality of timing offsets, and each of the timing offsets is associated with a respective one of a plurality of time slots. The time slots can be of equal duration.

In other features, a media access controller executes the steps of transmitting call signaling information, receiving the timing offset, entering the sleep mode, and periodically waking up. The steps of transmitting call signaling information and receiving the timing offset can be otherwise compliant with one of Bluetooth, IEEE 802.11, 802.11a, 802.11b, 802.11g, 802.11h, 802.11n, 802.16, and 802.20. The computer program can include generating an audio signal based on the data.

In other features, a computer program of operating a wireless network is provided. The computer program includes the computer program described above and further comprises a computer program of operating a quality-of-service enhanced access point (QAP) that includes receiving the call signaling information from the QSTA, determining the timing offset based on the call signaling information, transmitting the timing offset to the QSTA, and transmitting at least a portion of the buffered data to the QSTA in response to receiving the polling message.

In other features, a computer program of operating a wireless telephone handset is also provided that further includes generating an audio output signal based on the data, generating an audio input signal based on an audible signal, and periodically transmitting the digitized audio input signal.

A quality-of-service enhanced wireless station (QSTA) is provided that includes signaling means for transmitting call signaling information and receiving a timing offset that is based on the call signaling information, and wireless local area network (WLAN) driver means for providing a sleep mode for conserving power and periodically waking up based on the timing offset, immediately sending a polling message, and receiving data that is addressed to the QSTA.

The WLAN driver means can include timing means for periodically waking up the WLAN driver means. The call signaling information can include at least one of a maximum service interval, a minimum service interval, and a mean data rate. The timing offset can include one of a plurality of timing offsets, and each of the timing offsets is associated with a respective one of a plurality of time slots. The time slots are of equal duration.

In other features, the QSTA includes medium access control (MAC) means for controlling access to a wireless medium and that includes the signaling means and the WLAN driver means. The QSTA can include physical layer means (PHY) for communicating with the MAC and that is otherwise compliant with one of Bluetooth, IEEE 802.11, 802.11a, 802.11b, 802.11g, 802.11h, 802.11n, 802.16, and 802.20. The QSTA can also include telephone handset means for communicating with the PHY through interface means for interfacing.

In other features, a wireless network is provided that includes the QSTA and a quality-of-service enhanced access point (QAP), where the QAP includes second signaling means for receiving the call signaling information from the QSTA and transmitting the timing offset to the QSTA, call offset scheduler means for determining the timing offset based on the call signaling information, buffer means for buffering the data addressed to the QSTA, and wireless local area network (WLAN) driver means for transmitting at least a portion of the buffered data to the QSTA in response to receiving the polling message.

In other features, a wireless telephone handset includes the QSTA and further includes audio output means for generating an audio output signal and audio input means for generating an audio input signal, and interface means for communicating with the QSTA, the audio output signal, and the audio input signal.

BRIEF DESCRIPTION OF THE DRAWINGS

The present invention will become more fully understood from the detailed description and the accompanying drawings, wherein:

FIG. 6 illustrates steps of a method for scheduling polling messages;

FIG. 8 illustrates steps of a method for initiating scheduled polling messages;

DETAILED DESCRIPTION OF THE PREFERRED EMBODIMENTS

Figure 1:
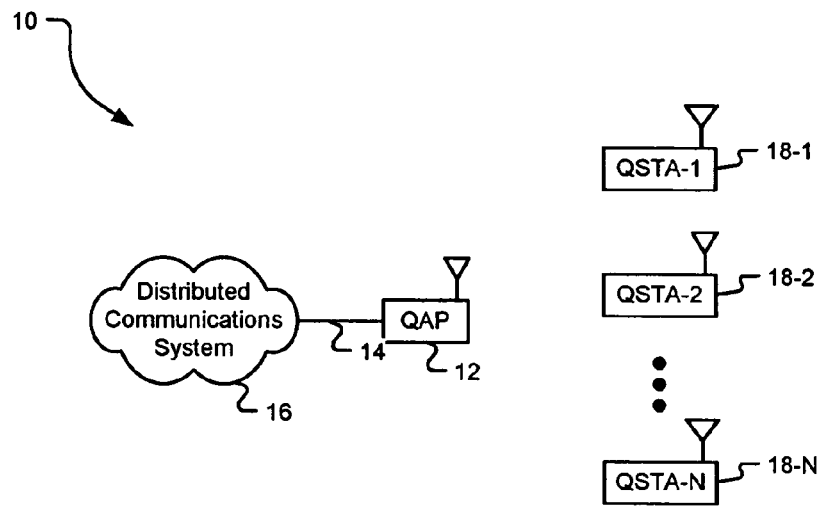
FIG. 1 is a functional block diagram of a wireless local area network of the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

Figure 3:
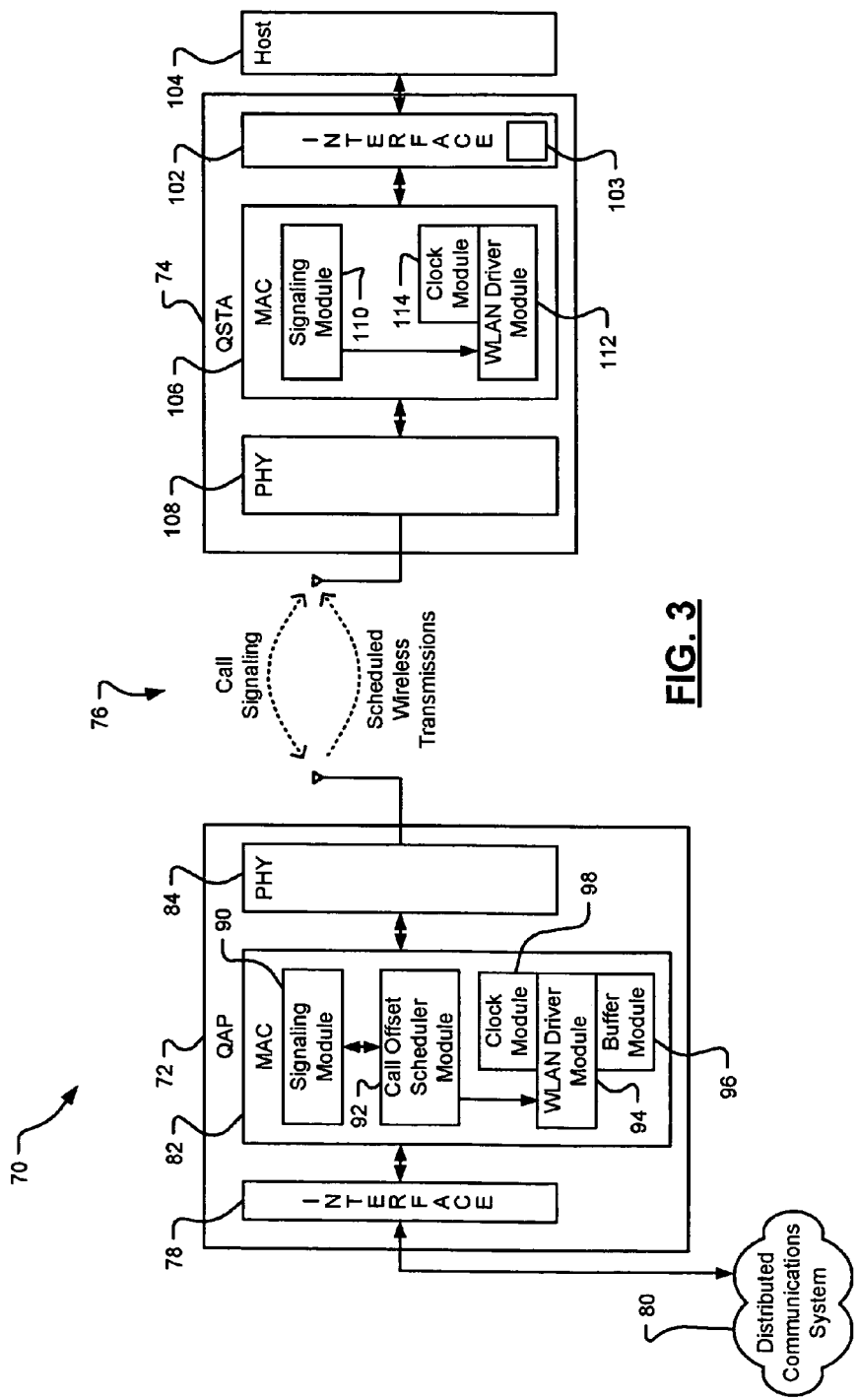
FIG. 3 is a functional block diagram of an improved quality-of-service enhanced access point (QAP) and an improved quality-of-service enhanced wireless station (QSTA)

Referring now to FIG. 3, an improved wireless local area network 70 is shown. A QAP 72 communicates with a QSTA 74 over a wireless channel 76. The QAP 72 and QSTA 74 include various modules that implement a power saving mode for the QSTA 74. The QAP 72 includes an interface module 78 that provides communication between a distributed communications system (DCS) 80, such as the Internet, and a media access controller module (MAC) 82. The MAC 82 communicates with a physical layer module (PHY) 84 that wirelessly transmits and receives data over the wireless channel 76.

The MAC 82 includes a wireless local area network (WLAN) driver module 94 and a signaling module 90 that communicates with a call offset scheduler module 92. The signaling module 90 and the call offset scheduler module 92 cooperate to schedule wireless transmissions from the QAP 72 to the QSTA 74.

The MAC 82 also includes a buffer module 96 and a clock module 98. The buffer module 96 buffers data that arrives from the DCS 80 and is addressed to the QSTA 74. The clock module 98 periodically wakes up the WLAN module 94. Once awake, the WLAN module 94 listens for a polling signal from the QSTA 74 and in response thereto sends at least a portion of the buffered data to the QSTA 74.

The QSTA 74 is a portable wireless device and can be included in a VoIP telephone, multi-mode cell phone, and/or a voice-over-WLAN device. The QSTA 74 includes an interface module 102 that provides communication between a host module 104 and a MAC 106. The host module 104 can include devices such as a telephone handset and/or other human-machine communication interface. In such embodiments, the interface module 102 includes an audio coder/decoder (CODEC) 103 that bidirectionally converts audio signals between the host module 104 and the MAC 106.

The MAC 106 communicates with a PHY 108 that transmits and receives digital data packets over the wireless channel 76. The MAC 106 also includes a signaling module 110 that communicates with a WLAN driver module 112. The signaling module 110 exchanges call signaling information with the signaling module 90 of the QAP 72. Details of the call signaling information are described below. The WLAN driver module 112 then receives the scheduled wireless transmissions from the QAP 72 and formats them into a signal format compatible with the interface module 102. A clock module 114 wakes up the WLAN driver module 112 at times that are determined by, and synchronized with, the clock module 98 in the QAP 72. The clock module 98 and the clock module 114 are synchronized by beacon messages such as those described by the Institute of Electrical and Electronics Engineers (IEEE) standard 802.11 as amended, which is hereby incorporated by reference in its entirety. The QAP 72 and the QSTAs can also be compliant with the one or more of the IEEE standards 802.11, 802.11a, 802.11b, 802.11g, 802.11h, 802.11n, 802.16, and/or 802.20 as amended, which are hereby incorporated by reference in their entirety. The QAP 72 and the QSTAs can also be compliant with the Bluetooth specification, which is hereby incorporated by reference in its entirety.

Figure 3A:
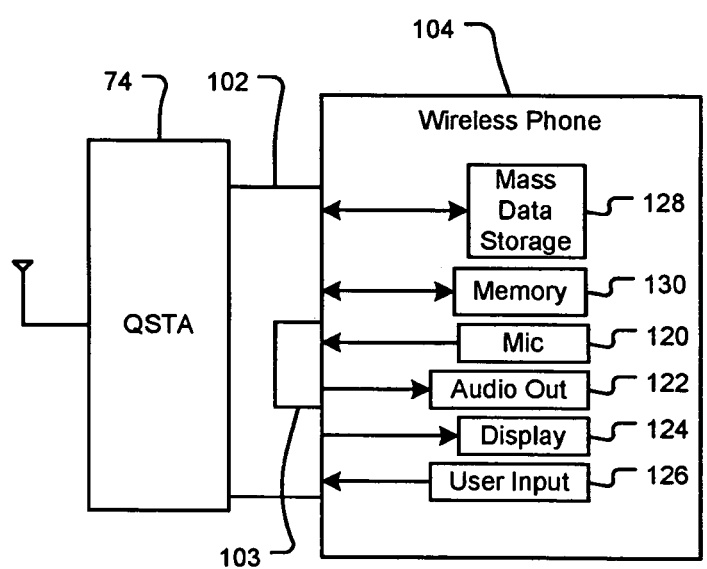
FIG. 3A is a functional block diagram of a QAP and a wireless telephone handset that includes a QSTA.

Referring now to FIG. 3A, the host 104 is shown implemented as a wireless telephone handset that is integral with the QSTA 74 and the interface module 102. In some implementations, the telephone handset host 104 includes a microphone 120, an audio output 122 such as a speaker and/or audio output jack, a display 124 and/or an input device 126 such as a keypad, pointing device, voice actuation and/or other input device. The interface module 102 may process data, perform coding and/or encryption, perform calculations, format data and/or perform other telephone handset functions.

The telephone handset host 104 may include mass data storage 128 that stores data in a nonvolatile manner such as optical and/or magnetic storage devices for example hard disk drives (HDDs) and/or digital versatile disks (DVDs). The HDD may be a mini HDD that includes one or more platters having a diameter that is smaller than approximately 1.8". The telephone handset host 104 may include memory 130 such as RAM, ROM, low latency nonvolatile memory such as flash memory and/or other suitable electronic data storage.

Figure 2:
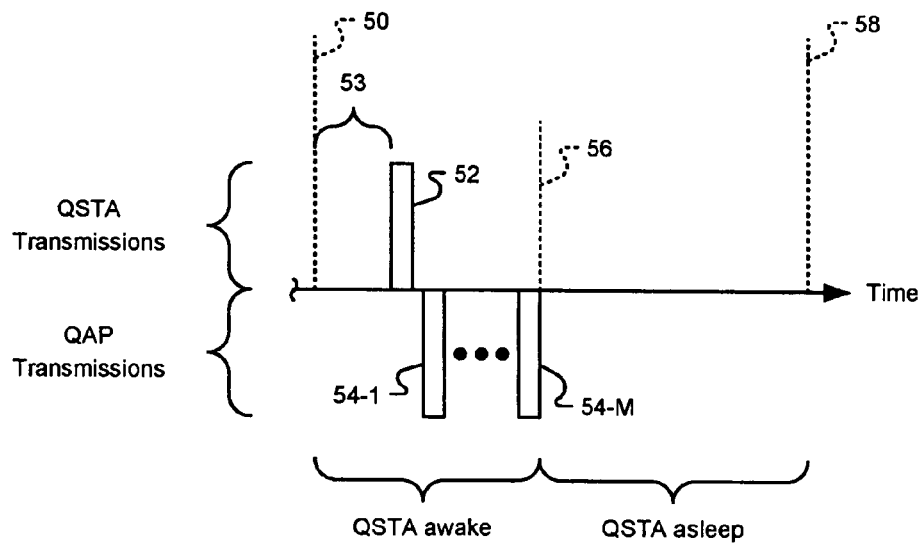
FIG. 2 illustrates a timeline of power saving mode wireless transmissions of the prior art.
Figure 4:
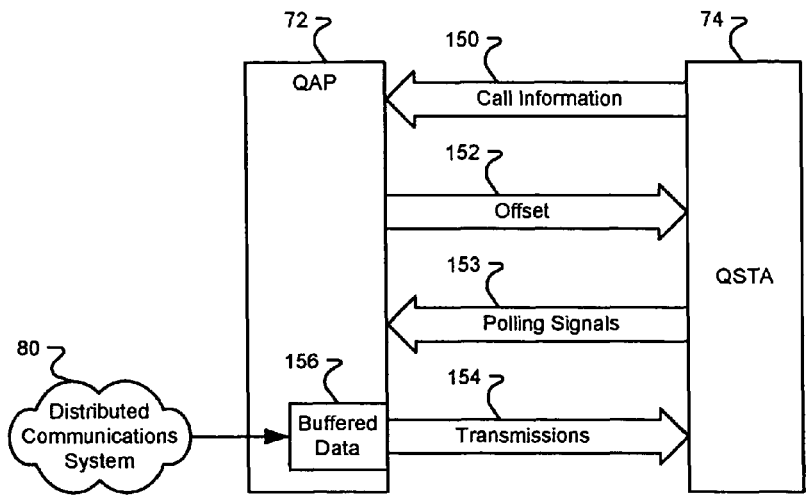
FIG. 4 is a functional block diagram of a wireless exchange between a QAP and a QSTA.

Referring now to FIG. 4, a functional block diagram is shown of pertinent wireless communications between the QAP 72 and the QSTA 74. The QSTA 74 requires data at a predetermined rate in order to maintain a desired quality of service. The QSTA 74 is generally powered by a battery and in such cases should remain asleep as much as possible to conserve energy. The wireless communications therefore establish a timing schedule for the QSTA 74 to wake up at a predetermined time, immediately send the polling signal, and then receive wireless transmissions from the QAP 72. The timing schedule ensures that no other QSTA is transmitting when the QSTA 74 wakes up to transmit its polling signal (FIG. 2). This reduces the likelihood of a collision when the QSTA 74 transmits its polling signal and allows smaller backoffs to be used in the collision avoidance protocol. In some applications the QSTA 74 can wake up and immediately transmit the polling signal without waiting and/or executing the collision avoidance protocol. The timing schedule therefore allows the QSTA 74 to remain in the sleep state for a longer period and therefore conserve more power than the QSTAs 18 of the prior art (FIGS. 1-2).

The QSTA 74 initiates the wireless communications by sending call signaling information 150 to the QAP 72. The call signaling information 150 includes a minimum and/or maximum time interval, and/or rate, that the QSTA 74 must receive data to maintain the desired quality of service. The QAP 72 receives the call signaling information 150 and accordingly determines the timing schedule. The timing schedule also accommodates other QSTAs 74 (not shown) that are associated with the QAP 72. Once the QAP 72 determines the timing schedule, it sends an offset 152 to the QSTA 74. The offset 152, which will be described later, indicates to the QSTA 74 when to transmit polling signals 153. The QAP 72 responds to each polling message 153 by transmitting at least a portion of buffered data 156 to the QSTA 74.

Figure 5:
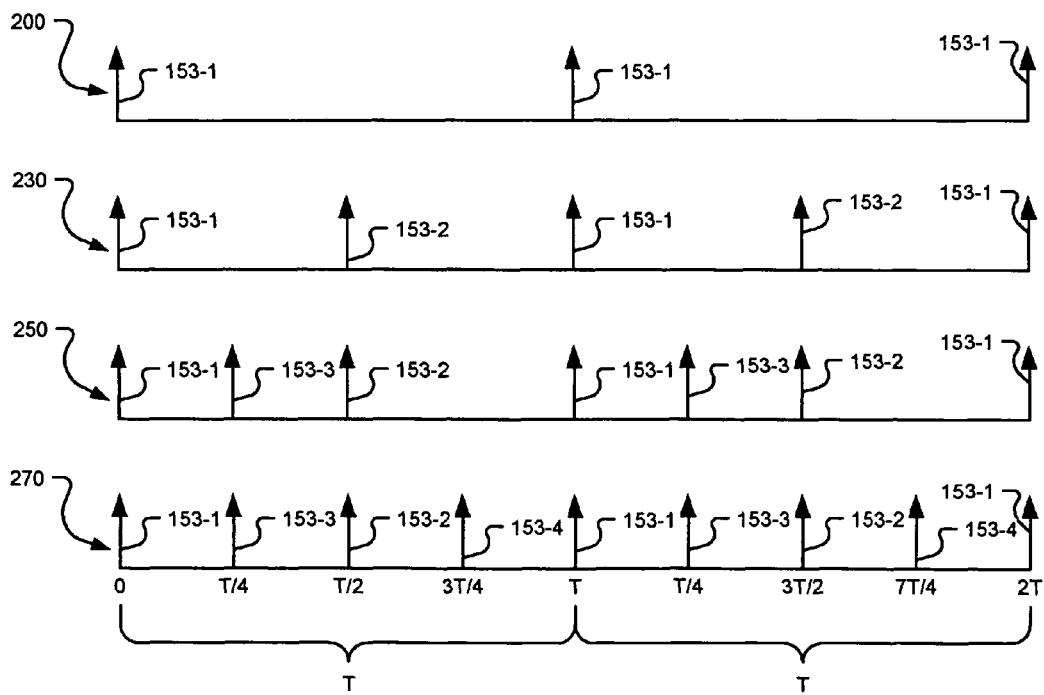
FIG. 5 illustrates scheduled polling messages.

Referring now to FIG. 5, several timing diagrams are shown of scheduled polling signals 153 from varying numbers of QSTAs 74. The following description uses suffixes to refer to individual QSTAs 74. For example, a first QSTA is referred to as the first QSTA 74-1, a second QSTA is referred to as the second QSTA 74-2, and so forth. The scheduled polling signals 153 also have suffixes that match the suffixes of their associated QSTA. For example, scheduled polling signals 153-1 are associated with the first QSTA 74-1, scheduled polling signals 153-2 are associated with the second QSTA 74-2 and so forth. The horizontal axes of the timing diagrams represent time, and the vertical arrows represent the scheduled wireless transmissions 154.

A first timing diagram 200 shows scheduled polling signals 153-1 from the first QSTA 74-1 to the QAP 72. The scheduled polling signals 153 occur once every period T with an offset of zero. The call offset scheduler module 92 (FIG. 3) uses a method that is described later to determine the period T that satisfies the minimum and maximum periods specified by the first QSTA 74-1

A second timing diagram 230 shows the effect of the second QSTA 74-2 becoming associated with the QAP 72. The call offset scheduler module 92 assigns the second QSTA 74-2 an offset that maximizes the separation between the scheduled polling signals 153-1 and 153-2. In this case, the offset is two, meaning the scheduled polling signals 153-2 occur two time slots after the beginning of the period T. In the depicted example, each time slot has a duration of T/4, although other integer divisors of T can be used as is described below.

A third timing diagram 250 shows the effect of a third QSTA 74-3 becoming associated with the QAP 72. The call offset scheduler module 92 again assigns an offset to the third QSTA 74-1 that maximizes the separation between the scheduled polling signals 153, 153-2, and 153-3. In this case, the call offset scheduler module 92 assigned the third QSTA 74-3 an offset of one. The call offset scheduler module 92 could also have assigned an offset of three since it provides an equivalent separation between the scheduled wireless transmissions 154. The selection between equivalent offsets can initially be random and then changed later. For example, the call offset scheduler module 92 may change the call offsets of one or more QSTAs 74 to accommodate additional QSTAs 74 and/or to reduce a packet error rate of QSTAs 74 that are already associated with the QAP 72.

A fourth timing diagram 270 shows the effect of a fourth QSTA 74-4 becoming associated with the QAP 72. In this case, the call offset scheduler module 92 assigns the fourth QSTA 74-4 a call offset of three since it is the only remaining offset.

Referring now to FIG. 6, a method 300 is shown for receiving the call signaling information 150 from the QSTA 74 and transmitting the offset 152 to the QSTA 74. The signaling module 90 executes the method 300 when the MAC 82 receives the call signaling information 150 from the QSTA 74. Control enters in step 302 and proceeds to step 304 to receive the call signaling information 150 from the QSTA 74. As stated above, the call signaling information 150 includes the minimum and/or maximum period that the QSTA 74 needs between the scheduled wireless transmissions 154 in order to maintain the desired quality of service. Control then proceeds to block 306 and passes the call signaling information 150 to the call offset scheduler module 92. In block 308, the call offset scheduler module 92 executes a separate method, which is described later, that determines whether the QAP 72 can accommodate the QSTA 74 and, if so, the period T and/or offset for the QSTA 74. Control resumes in block 310 and receives the offset and/or period T from block 308. Control then transmits the offset and/or period T to the QSTA 74.

Figure 7:
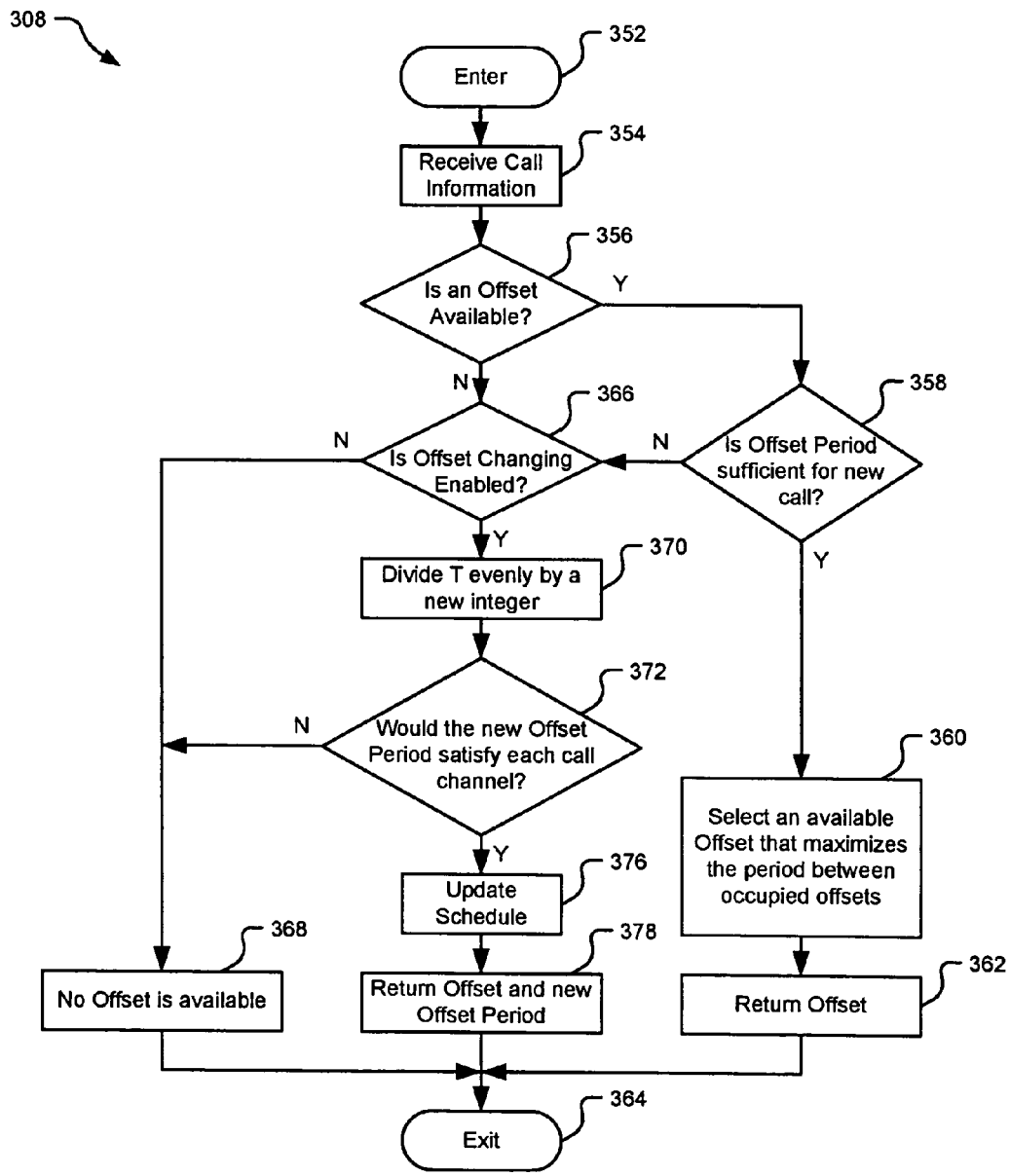
FIG. 7 illustrates sub-steps of the method of FIG. 6 for scheduling polling messages.

Referring now to FIG. 7, the method of block 308 is shown. The call offset scheduler module 92 executes the method and determines the offset and/or period T. Control begins in block 352 and proceeds to block 354. In block 354, control receives the call signaling information 150 and proceeds to decision block 356. In decision block 356 control determines if an offset is available. If so, control proceeds to block 358 and determines whether the duration of the present time slot satisfies the call information. If so, control proceeds to block 360 and selects an available offset that maximizes the separation between the offsets that are associated with QSTAs 74. Control then proceeds to block 362 and returns the offset to block 310 before exiting through block 364.

If, in decision block 356, control determines that there are no offsets available, control proceeds to decision block 366 and determines whether the call offset scheduler module 92 is configured to change the number of time slots. The configuration can be implemented through a bit selection in software and/or firmware. If the call offset scheduler module 92 is not configured to change the number of time slots, then control proceeds to block 368 and returns information to block 310 to indicate that no offset is available. At block 368, the QAP 72 is at capacity and cannot accommodate the QSTA 74 until another QSTA 74 that is already associated with the QAP 72 terminates its call.

If, in decision block 366, control determines that the call offset scheduler module 92 is configured to change the number of time slots, then control proceeds to block 370. In block 370, control divides the period T into a larger number of time slots to accommodate the QSTA 74. Control then proceeds to decision block 372 and determines whether the larger number of time slots satisfies the call information of the QSTA 74 as well as the call information of the QSTAs 74 that are already associated with the QAP 72. If the result in decision block 372 is negative, then the QAP 72 is at capacity and cannot accommodate the QSTA 74 until another QSTA 74 that is already associated with the QAP 72 terminates its call. Control then proceeds to block 368 and continues as described above.

However, if the result in decision block 372 is affirmative, then control proceeds to block 376 and updates the schedule. Control then proceeds to block 378 and returns the offset, time slot duration, and/or period T to block 310. Control then proceeds to block 364 and exits.

Referring now to FIG. 8, a method 400 is shown. The method 400 is executed by the signaling module 110 in the QSTA 74 each time it attempts to associate with the QAP 72. Control begins in block 402 and proceeds to block 404. In block 404, control sends the call signaling information 150 to the QAP 72. Control then proceeds to block 406 and receives the reply from the QAP 72. As described above in blocks 362, 368, and 378, the reply can include, respectively, an indication that the QAP 72 has an offset available and is providing it to the QSTA 74, does not have an offset available, or has an offset available and is changing the period T. Control then proceeds to block 408 and configures the clock module 114 in accordance with the reply from the QAP 72. Once the clock module 114 is configured it periodically wakes up WLAN driver module 112 according to the offset received in block 406. Control exits through block 410 after configuring the clock module 98.

Figure 9A:
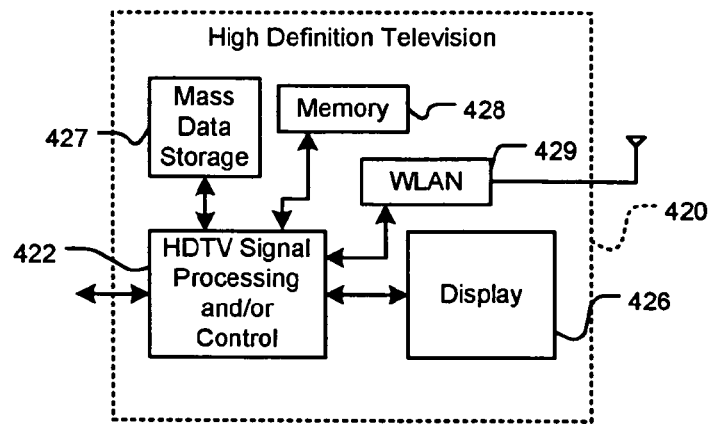
FIG. 9A is a functional block diagram of a wireless local area network (WLAN) interface in a high definition television.

Referring now to FIGS. 9A-9E, various exemplary implementations of the present invention are shown. Referring now to FIG. 9A, the present invention can be implemented in a high definition television (HDTV) 420. The present invention may implement a WLAN interface of the HDTV 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Figure 9B:
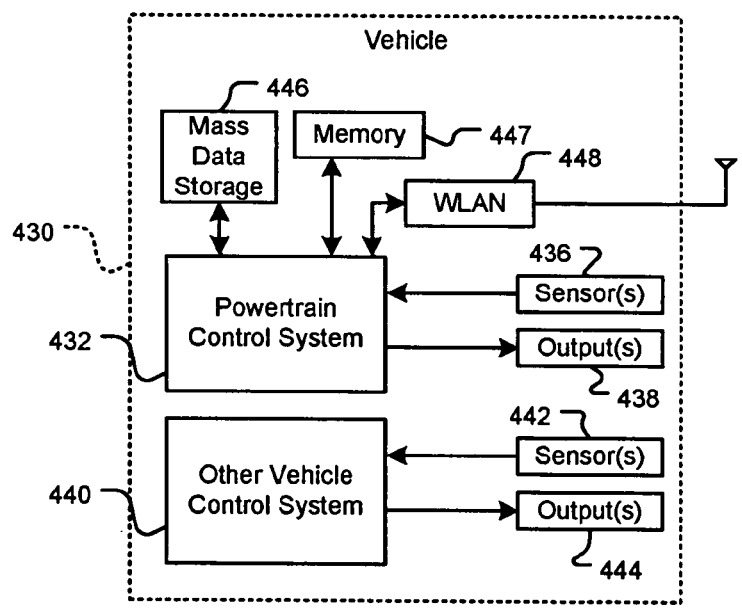
FIG. 9B is a functional block diagram of a WLAN interface in a vehicle control system.

Referring now to FIG. 9B, the present invention implements a WLAN interface of a vehicle control system. In some implementations, the present invention implement a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVDs. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 9C:
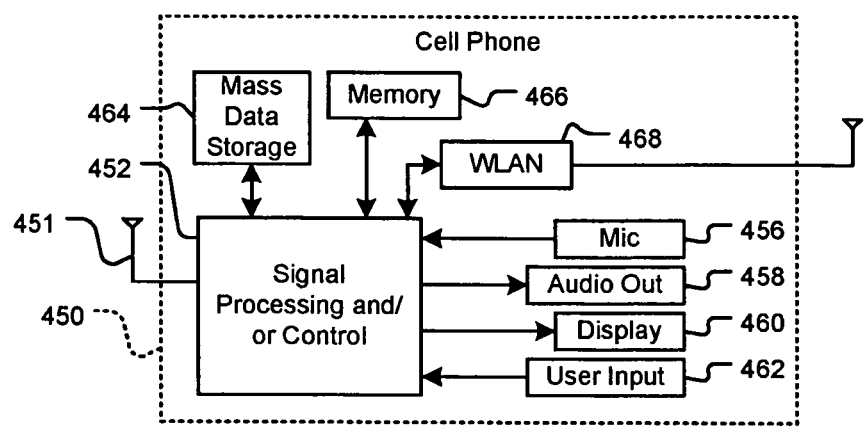
FIG. 9C is a functional block diagram of a WLAN interface in a cellular phone.

Referring now to FIG. 9C, the present invention can be implemented in a cellular phone 450 that may include a cellular antenna 451. The present invention may implement a WLAN interface of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 9D:
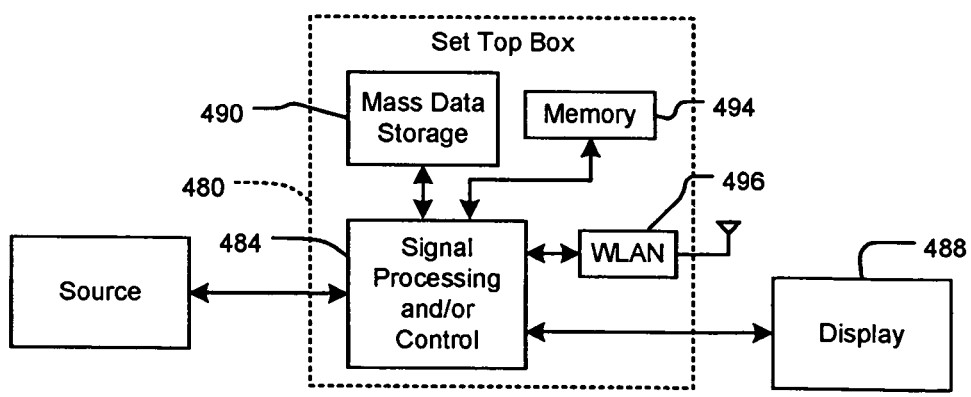
FIG. 9D is a functional block diagram of a WLAN interface in a set top box.

Referring now to FIG. 9D, the present invention can be implemented in a set top box 480. The present invention may implement a WLAN interface of the set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 9E:
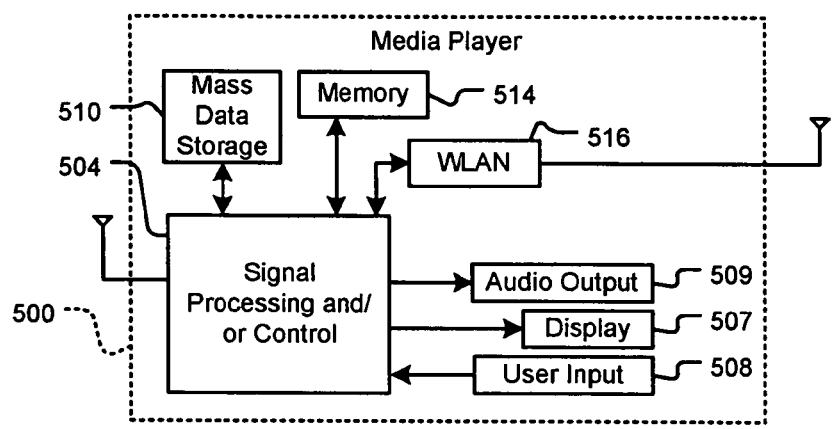
FIG. 9E is a functional block diagram of a WLAN interface in a media player.

Referring now to FIG. 9E, the present invention can be implemented in a media player 500. The present invention may implement a WLAN interface of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A quality-of-service enhanced access point (QAP) comprising:
a signaling module configured to receive call signaling information and to transmit a timing offset to a quality-of-service enhanced station (QSTA), wherein the call signaling information includes at least one of a maximum service interval, a minimum service interval, and a mean data rate;
a call offset scheduler module configured to determine the timing offset based on the call signaling information and to selectively change the timing offset associated with the QSTA based on a packet error rate (PER);

a buffer configured to buffer data addressed to the QSTA; and a wireless local area network (WLAN) driver module configured to receive polling messages aligned with the timing offset from the QSTA, and in response to receiving the polling messages, transmit at least a portion of the buffered data to the QSTA, wherein the timing offset indicates to the QSTA when to wake up and transmit one of the polling messages to the QAP during a predetermined period without executing a collision avoidance protocol.

2. The QAP of claim 1, wherein the WLAN driver module further comprises a timer that is synchronized with the polling messages.

3. The QAP of claim 1, wherein the timing offset includes one of a plurality of timing offsets, and wherein each of the timing offsets is associated with a respective one of a plurality of time slots.

4. The QAP of claim 3, wherein the time slots are of equal duration.

5. The QAP of claim 1, wherein the signaling module, the call offset scheduler module, the buffer, and the WLAN driver module are implemented in a medium access control (MAC) module.

6. The QAP of claim 5, further comprising a physical layer module (PHY) configured to communicate with the MAC and that is otherwise compliant with one of Bluetooth, IEEE 802.11, 802.11a, 802.11b, 802.11g, 802.11h, 802.11n, 802.16, and 802.20.

7. A wireless telephone system comprising: the QAP of claim 1; and a wireless telephone handset, wherein the wireless telephone handset includes:

an audio output and an audio input; and an interface module configured to communicate with the QSTA, the audio output, and the audio input.

8. The QAP of claim 1, wherein when the timing offset is N, where N is an integer greater than or equal to 0, the QSTA transmits one of the polling message to the QAP N time slots after the predetermined period begins.

9. The QAP of claim 8, wherein duration of the N time slots is based on a number of quality-of-service enhanced stations (QSTAs) communicating with the QAP during the predetermined period.

10. The QAP of claim 1, wherein in response to an additional QSTA communicating with the QAP, the timing offset maximizes a separation between one of the polling messages transmitted by the QSTA to the QAP and an additional polling message transmitted by the additional QSTA to the QAP during the predetermined period.

11. A method for operating a quality-of-service enhanced access point (QAP), the method comprising:

receiving call signaling information, wherein the call signaling information includes at least one of a maximum service interval, a minimum service interval, and a mean data rate;

determining a timing offset, for transmission to a quality-of-service enhanced station (QSTA), based on the call signaling information;

selectively changing the timing offset associated with the QSTA based on a packet error rate (PER);

transmitting the timing offset to the QSTA;

buffering data that is addressed to the QSTA;

receiving polling messages aligned with the timing offset from the QSTA; and transmitting at least a portion of the buffered data to the QSTA in response to receiving the polling messages, wherein the timing offset indicates to the QSTA when to wake up and transmit one of the polling messages to the QAP during a predetermined period without executing a collision avoidance protocol.

12. The method of claim 11, further comprising waking up prior to receiving each of the polling messages and thereafter going back to sleep.

13. The method of claim 11, wherein the timing offset includes one of a plurality of timing offsets, and wherein each of the timing offsets is associated with a respective one of a plurality of time slots.

14. The method of claim 13, wherein the time slots are of equal duration.

15. The method of claim 11, further comprising providing a media access controller (MAC) configured to execute the steps of receiving, determining, transmitting, buffering, and automatically transmitting.

16. The method of claim 15, wherein the receiving step and the transmitting step are otherwise compliant with one of Bluetooth, IEEE 802.11, 802.11a, 802.11b, 802.11g, 802.11h, 802.11n, 802.16, and 802.20.

17. The method of claim 11, further comprising:

operating a wireless telephone system;

generating an audio output based on at least a portion of the buffered data.

18. The method of claim 11, wherein when the timing offset is N, where N is an integer greater than or equal to 0, the method further comprising transmitting from the QSTA one of the polling message to the QAP N time slots after the predetermined period begins.

19. The method of claim 18, further comprising determining a duration of the N time slots based on a number of quality-of-service enhanced stations (QSTAs) communicating with the QAP during the predetermined period.

20. The method of claim 11, further comprising in response to an additional QSTA communicating with the QAP, maximizing, based on the timing offset, a separation between one of the polling messages transmitted by the QSTA to the QAP and an additional polling message transmitted by the additional QSTA to the QAP during the predetermined period.

* * * * *